June 13, 1933.  F. A. GILLEN  1,914,250
CUT-OFF VALVE AND ACTUATING MEANS THEREFOR
Filed Dec. 18, 1931
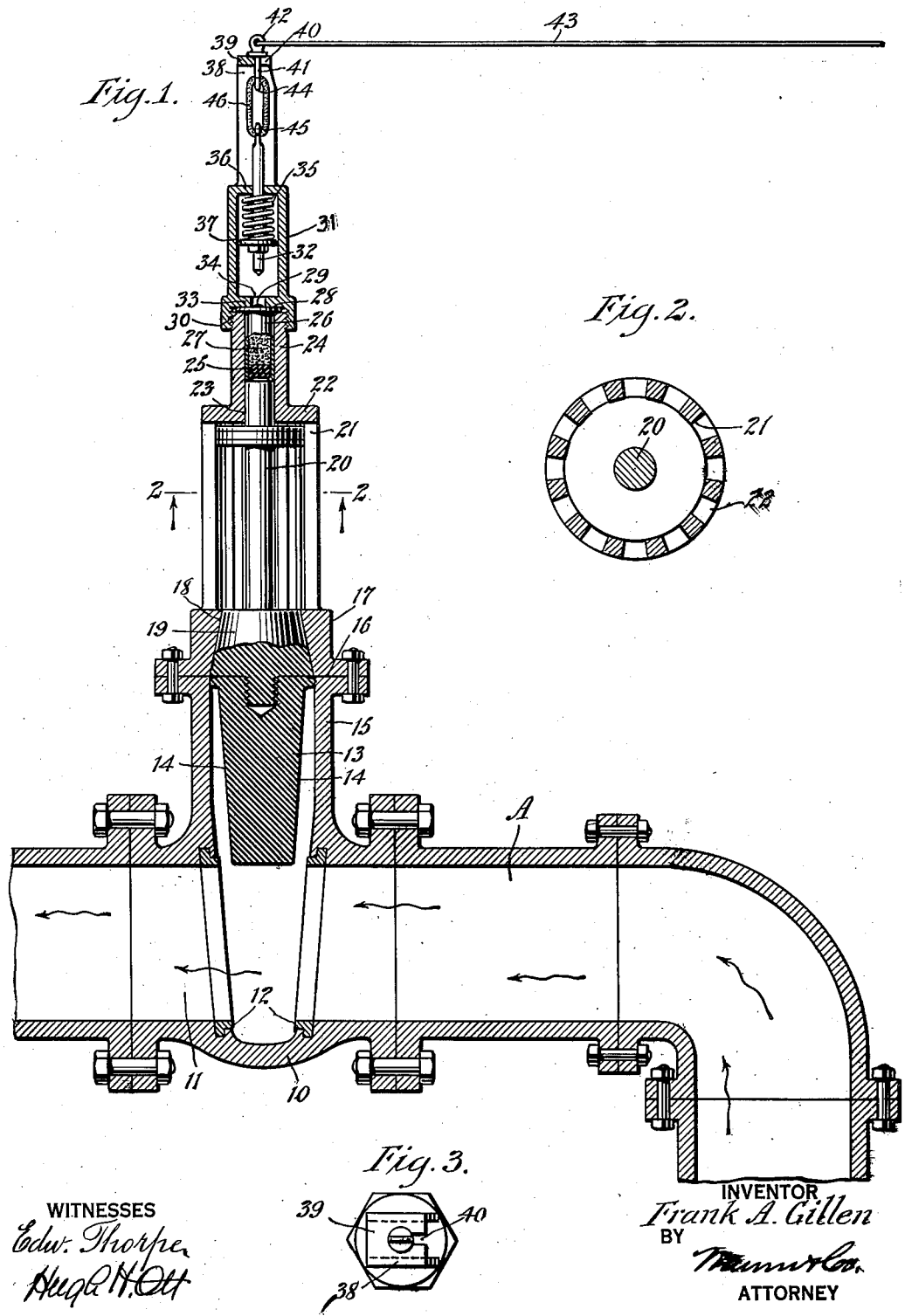
WITNESSES
Edw. Thorpe
Hugh H. Ott
INVENTOR
Frank A. Gillen
BY
ATTORNEY Patented June 13, 1933

1,914,250

UNITED STATES PATENT OFFICE

FRANK A. GILLEN, OF NEW YORK, N. Y.

CUT-OFF VALVE AND ACTUATING MEANS THEREFOR

Application filed December 18, 1931. Serial No. 581,963.

This invention relates generally to valves, and refers more particularly to a cut-off valve and actuating means for closing the same which is effective against a high fluid pressure, such as, for instance, in oil wells, or other analogous uses where the pressure of the fluid passing through the valve is an important factor to overcome in effecting the closing of the valve.

The invention aims for one of its objects to provide a valve closing means which is operable by the impact of an explosive charge of sufficient force to overcome any possible resistance which may be offered by the fluid pressure passing through the valve casing.

The invention further contemplates in combination with an explosively operable valve closing means, normally restrained means for firing or igniting the charge, which firing or igniting means is releasable and rendered active either manually or when subjected to a predetermined heat.

The invention aims for a still further object to provide a valve casing and valve plug which are so constructed as to eliminate the necessity of employing a stuffing box or packing gland for sealing the casing at the point where the valve stem extends therethrough, thereby eliminating the friction and resultant retardation to the closing movement of the valve, while affording a more effective means for preventing leakage of the fluid pressure when the valve is open, than is possible with packing glands or stuffing boxes.

Other objects of the invention reside in a valve and valve actuating means of the indicated character which employs but few and simple parts capable or economical production and assemblage and which is highly efficient for the intended purpose.

With the above recited and other objects in view, reference is had to the following description and accompanying drawing, in which there is exhibited one example or embodiment of the invention, while the claims define the actual scope of the same.

In the drawing:

Figure 1 is a vertical sectional view through a valve and actuating means therefor constructed in accordance with the invention.

Figure 2 is an enlarged horizontal sectional view taken approximately on the line indicated at 2—2 in Figure 1.

Figure 3 is a top plan view particularly illustrating the releasable means for restraining the firing or igniting means.

Referring to the drawing by characters of reference, 10 designates a valve casing, which in the present instance is disclosed as of the gate valve type, although not necessarily restricted to this class of valve. The casing defines a fluid passage 11 which is intersected by seats 12, the confronting faces of which converge in the direction of closing movement of the valve plug or gate 13 which has correspondingly converegent side faces 14 adapted to cooperate with the convergent seat faces. As illustrated, the casing is formed with a laterally, and in the present instance, an upwardly projecting boss 15 which is designed to receive and house the valve plug or gate 13 when the same is in its inactive unseated position, so as not to interfere with the free passage of fluid through the fluid passage 11 of the casing. The valve plug or gate 13 is provided adjacent its upper end with an external configuration 16 corresponding approximately to the internal configuration of the boss 15 to provide a snug fit which, while not necessarily fluid proof, affords a substantial bearing and guide for the valve plug or gate 13. A bonnet 17 is secured to the outer or upper end of the boss 15 and defines an opening 18 therethrough which is tapered or conical and constitutes a seat with which a corresponding tapered or conical head 19 of the valve plug 13 engages to insure a fluid tight seal when the valve plug 13 is unseated or inactive so as to avoid leakage at the point where the actuating stem 20 for the valve plug extends through the bonnet 17. It will be understood and appreciated that the pressure of the fluid in the valve casing 10 will function to insure the sealing of the head 19 in the seat 18 and thus avoid leakage without resorting to the use of a stuffing box or packing gland at this point. As illustrated, the bonnet 17 carries an outwardly, and in the present instance, an upwardly projecting cylindrical foraminous extension 21 which is of appreciably greater internal diameter than the external diameter of the stem 20 and within which is adapted to slide an enlarged plunger 22 which frictionally fits the internal diameter of the extension 21. The upper end 22 of the extension is provided with an aperture 23 of a size to snugly receive the upper end of the stem 20, and a barrel 24, preferably integral with the upper end 22, extends upwardly therefrom and is formed with a bore 25 corresponding to the diameter of the aperture 23 for receiving therein the upper end of the stem 20. The upper end of the barrel constitutes a chamber for the reception of a cartridge 26 containing an explosive charge 27. The cartridge is provided at its upper end with an enlarged head 28 which bears against the upper end of the barrel 24 and is provided with a central percussion cap 29. The upper end of the barrel is externally threaded as at 30 and receives thereover a cap 31 within which a firing pin 32 is arranged for guided longitudinal movement. The cap 31 is formed with an internal annular flange 33 defining a central opening 34 in alignment with the percussion cap 29. A firing pin spring 35 surrounds the firing pin and is interposed between the upper end 36 of the cap 31 and a spring seat 37 affixed to the firing pin, so that the spring when the firing pin is released, drives the pin through the aperture 34 into contact with the percussion cap 29 for firing the explosive charge which acts against the upper end of the stem 20 to drive the valve plug or gate 13 downwardly into seated relation to the seats 12 for cutting off the flow of fluid to the fluid passage 11 of the valve casing 10.

In order to provide means for releasably holding the firing pin in a retracted position whereby the same may be either manually released or released by a predetermined temperature, the cap 31 carries a yoke 38, the outer bight portion 39 of which is formed with a slot 40. A manually displaceable retainer comprising a shank 41 engageable in the slot 40 is provided, and the shank is formed with a head 42 which overlies the bight 39 and which has attached thereto a displacing cable 43. The opposite end of the shank 41 is formed with a hooked terminal 44, and the firing pin 32 is formed with a hooked terminal 45. A fusible link 46 is engaged with the terminals 44 and 45 and when the displaceable retainer is in position on the yoke, the firing spring 35 is held under tension and the firing pin retracted.

In use and operation, where the valve is installed adjacent the outlet end of an oil well casing A, in event the discharge becomes ignited, it is apparent that the displaceable retainer 41 may be manually displaced by exerting a pull on the cable 43. If the heat generated from the ignited oil is sufficient to melt the fusible link 40, it is obvious that the firing pin will be released. In either instance, the release of the firing pin will cause the same to forcibly engage with the percussion cap 29 to explode the explosive charge 27 and effect the movement of the plug 13 to a closed condition.

From the foregoing, it will thus be seen that a cut-off valve and operating means therefor has been devised which may be either automatically or manually rendered effective to cut off the flow of fluid through the valve casing.

What is claimed is:

1. In a cut-off valve, a valve casing and a valve plug having a controlling stem protruding from the casing and interengageable portions on said plug and casing, effective by the pressure of the fluid passing through the casing when the plug is in unseated inactive position, to seal the casing against leakage at the point where the stem protrudes and explosive means for acting upon the stem to move the valve plug to its active position for cutting off the flow of fluid through the casing.

2. In a cut-off valve, a valve casing and a valve plug having a controlling stem protruding from the casing and interengageable portions on said plug and casing, effective by the pressure of the fluid passing through the casing when the plug is in unseated inactive position, to seal the casing against leakage at the point where the stem protrudes and explosive means for acting upon the stem to move the valve plug to its active position for cutting off the flow of fluid through the casing, said means comprising a cartridge supported in juxtaposition to the stem for acting thereupon when discharged and means for discharging the same.

3. In a cut-off valve, a valve casing and a valve plug having a controlling stem protruding from the casing and interengageable portions on said plug and casing, effective by the pressure of the fluid passing through the casing when the plug is in unseated inactive position, to seal the casing against leakage at the point where the stem protrudes and explosive means for acting upon the stem to move the valve plug to its active position for cutting off the flow of fluid through the casing, said means comprising a cartridge supported in juxtaposition to the stem for acting thereupon when discharged and heat controlled means for discharging the same.

4. In a cut-off valve, a valve casing and a valve plug having a controlling stem protruding from the casing and interengageable portions on said plug and casing, effective by the pressure of the fluid passing through the casing when the plug is in unseated inactive position, to seal the casing against leakage at the point where the stem protrudes and explosive means for acting upon the stem to move the valve plug to its active position for cutting off the flow of fluid through the casing, said means comprising a cartridge supported in juxtaposition to the stem for acting thereupon when discharged and manually controlled means for discharging the same.

5. In a cut-off valve, a valve casing and a valve plug having a controlling stem protruding from the casing and interengageable portions on said plug and casing, effective by the pressure of the fluid passing through the casing when the plug is in unseated inactive position, to seal the casing against leakage at the point where the stem protrudes and explosive means for acting upon the stem to move the valve plug to its active position for cutting off the flow of fluid through the casing, said means comprising a cartridge supported in juxtaposition to the stem for acting thereupon when discharged and optional means for discharging the same manually or by a predetermined degree of heat.

6. In combination, a cut-off valve including a casing having a fluid passage extending therethrough and a valve seat in said passage, a valve plug adapted to be held normally open and having a controlling stem protruding from the casing and explosively operated means adapted to act upon the stem for moving the valve plug to closed active seated condition.

FRANK A. GILLEN.